Figure 1:
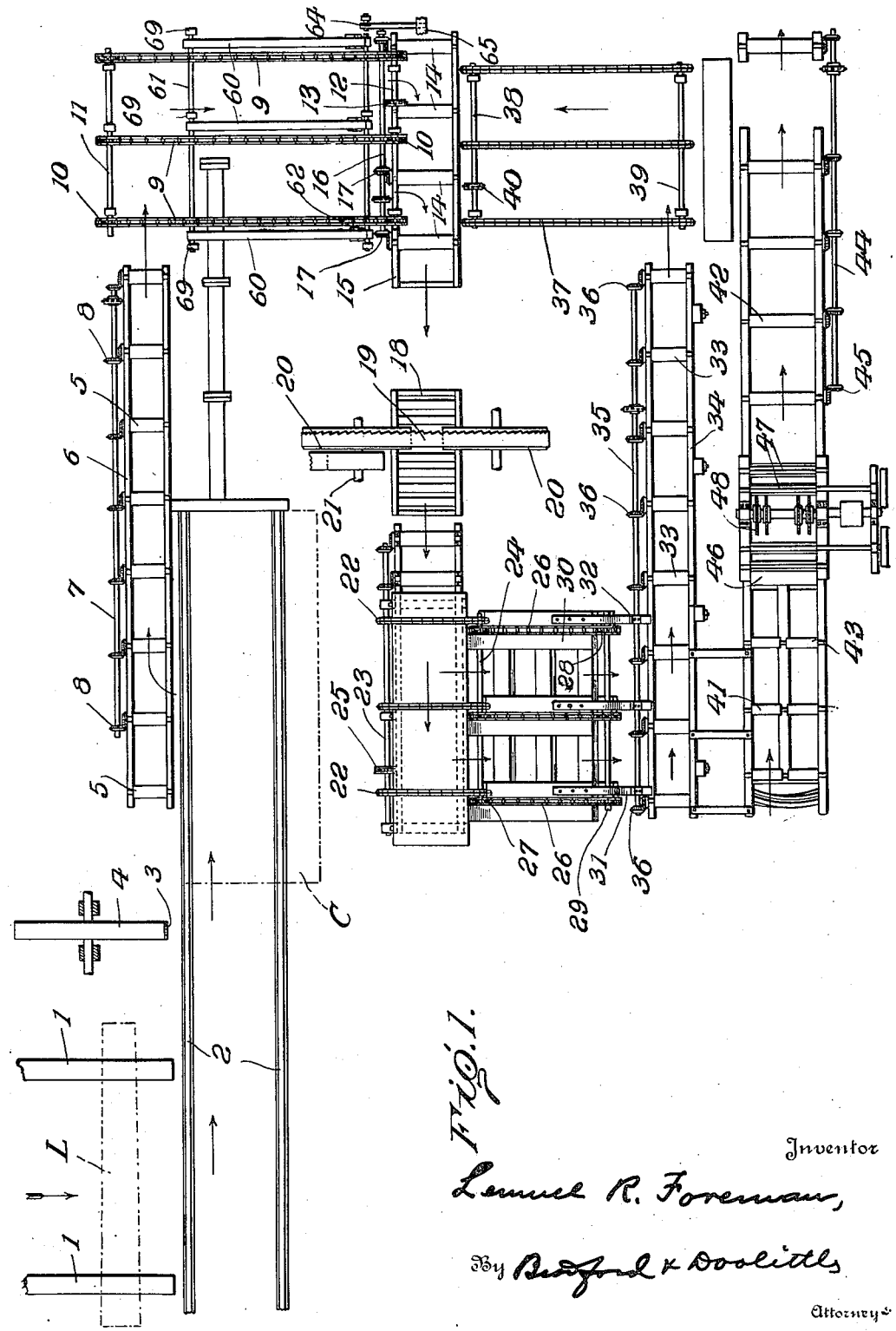

March 18, 1924.

L. R. FOREMAN

SAWMILL APPARATUS AND METHOD

Filed May 18, 1916        3 Sheets-Sheet 1

1,487,649

March 18, 1924.
L. R. FOREMAN
SAWMILL APPARATUS AND METHOD
Filed May 18, 1916 3 Sheets-Sheet 2
1,487,649
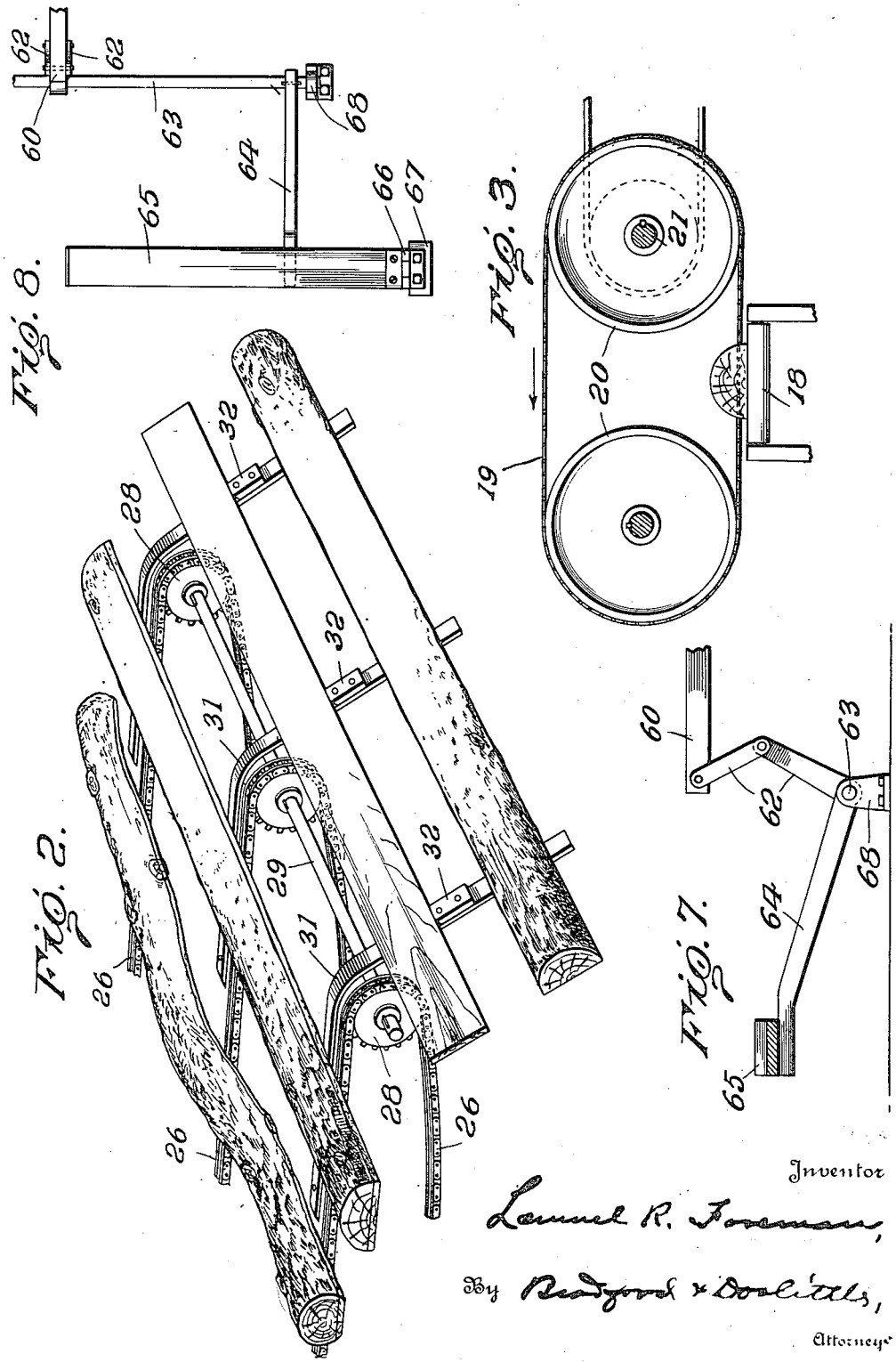

March 18, 1924. 1,487,649
L. R. FOREMAN
SAWMILL APPARATUS AND METHOD
Filed May 18, 1916 3 Sheets-Sheet 3
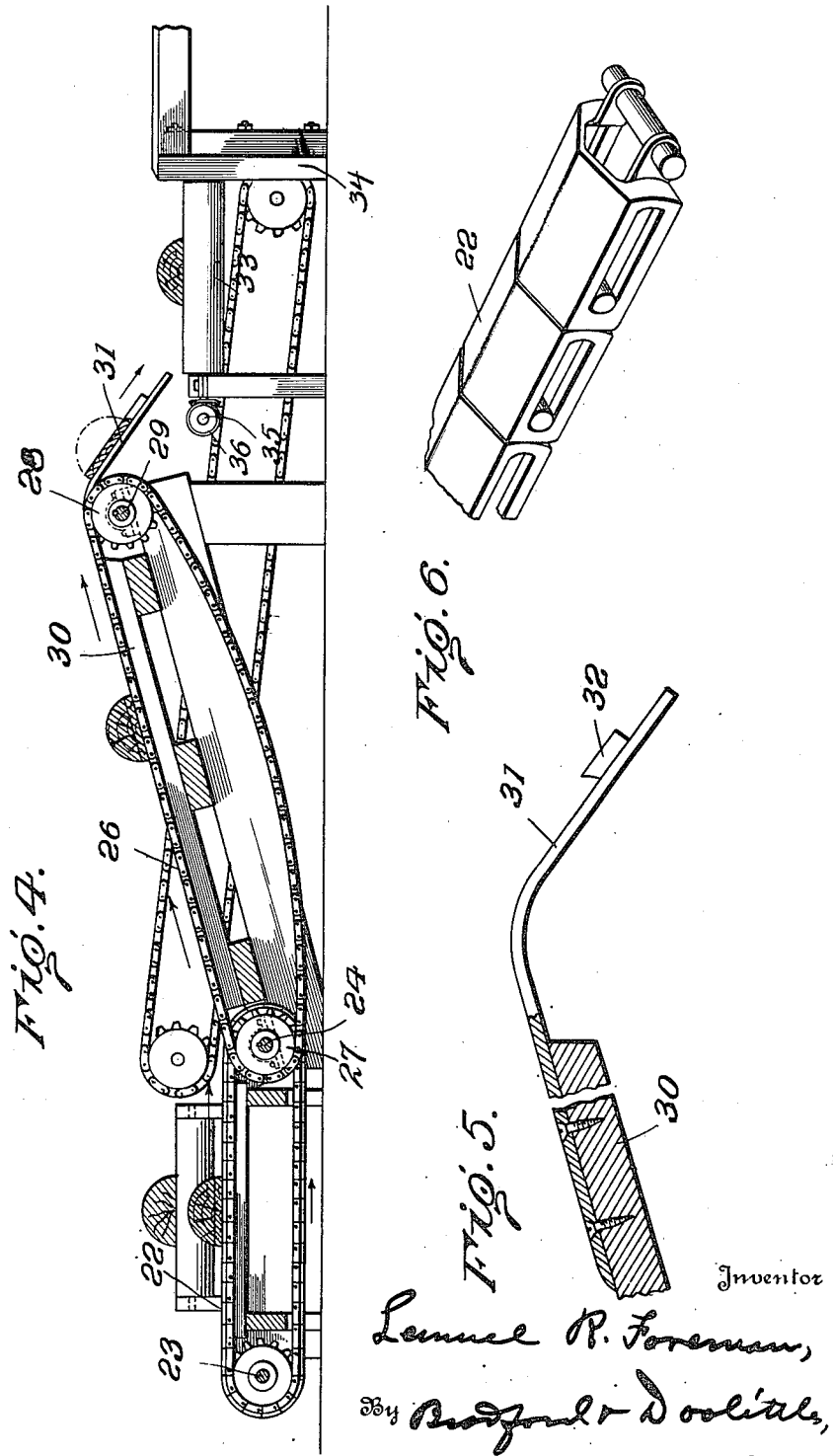

Patented Mar. 18, 1924.

1,487,649

UNITED STATES PATENT OFFICE.

LEMUEL ROSCOE FOREMAN, OF ELIZABETH CITY, NORTH CAROLINA.

SAWMILL APPARATUS AND METHOD.

Application filed May 18, 1916. Serial No. 98,340.

*To all whom it may concern:*

Be it known that I, LEMUEL ROSCOE FOREMAN, a citizen of the United States, residing at Elizabeth City, Pasquotank County, and State of North Carolina, have invented and discovered certain new and useful Improvements in Sawmill Apparatus and Methods, of which the following is a specification.

In saw mill apparatus for cutting up logs, the main part of the work, as commonly conducted heretofore, has been done by the vertical saw operating upon the log while supported by the "set-works" on the saw mill carriage. In some saw mills a horizontal re-saw is employed as a part of the apparatus, but its use is limited to splitting double thickness boards cut from the log by the initial or main vertical saw. As is well known, the kerf made by the vertical saw is comparatively much wider than the kerf made by the horizontal re-saw, because the saw is heavier and of wider "set". It is also well known that, in practice, the log has to be "set up" at each successive cut slightly more than required for the actual thickness of the board to be cut because of the slight variation in the thickness of the boards cut by the vertical saw resulting from the difficulty in securing accurate adjustment of the set-works. This necessitates providing for a slightly thicker cut than actually necessary in order to insure that all of the boards will be of sufficient thickness to answer the predetermined dimensions in this respect. It is also well known that it is almost impossible to saw small and crooked logs (which these days must be used along with the good logs for the sake of economy) to good advantage by the vertical saw, owing to the difficulty of securing the log by the dogs and "set-works" of the carriage for more than one or two cuts without springing or breaking the log and destroying its value for lumber.

It is also well known that in re-saw systems wherein the lumber is cut into double thicknesses by the vertical saw and merely split in half by the horizontal re-saw, that the re-saw, cutting in the reverse direction relative to the grain of the log, also causes some slight variation in thickness. The system of cutting by the vertical saw thus results in a considerable waste of lumber, and that re-saw system, which consists only in splitting the double thickness log-part cut by the vertical saw, also results in some waste because of the impossibility of arranging two different saws to cut with exactly the same results, especially when operating in reverse relation to the grain of the log. The kerfs cut by the comparatively thin horizontal re-saw, with the log resting firmly upon a rigid support, are of considerable less width than the kerfs cut by the heavy vertical saw, and if these cuts can be successive and follow each other in the same relative direction to the grain of the log, the cutting can be done with a minimum of waste. Frail, small and crooked log-parts, resting on the rigid table, can be sawed with accuracy by the re-saw and all possible lumber content saved, and this is no small part of the value of my invention.

In the usual operation of a saw mill employing a horizontal re-saw, it is also well known that the re-saw runs idle for much of the time because of the impossibility of supplying it with sufficient log-parts, cut to double thickness of the ultimate product by the vertical main saw, to keep it cutting constantly.

My invention, therefore, consists in certain improvements in the construction of the apparatus, whereby the horizontal re-saw may be employed to cut successive boards from the underside of a log-part resting firmly upon a rigid supporting table, which log-part has been merely "slabbed," or only partly cut, by the main saw so as to have a flat straight side on which it can rest during the re-sawing operation. The invention further consists in an arrangement whereby the log-parts are successively presented to the re-saw from the same side and run through the re-saw in the same direction, thus providing for successive cuts from said log-part with the saw running in the same relative position to the grain of the log. The invention further consists in a method of running the logs through the mill and utilizing the respective saws in successive operations, whereby the re-saw is kept supplied with constant work fed to it from the vertical saw, and the full capacity of the re-saw thus utilized. My invention further consists in improvements in the construction and arrangement of mechanism whereby a board cut from the underside of a log by the horizontal re-saw may be automatically separated from the rest of the log, and the full capacity of both saws thus utilized; thereby not only increasing the capacity of the mill materially, but also increasing the quantity of lumber cut from a single log, inasmuch as the saving in the width of the kerfs by the additional use of the re-saw enables an average of one additional board to be cut from each log of average size.

A further object of the invention resides in a system for cutting lumber in which the logs are caused to pass continuously through a given path for the successive sawing and transferring operations, thereby avoiding all unnecessary handling, and requiring the least amount of labor and minimum area for the plant, and primarily acquiring the maximum output of material within a given period of time.

The invention further consists in the steps of procedure and arrangements and combinations of parts hereinafter described and particularly set forth in the accompanying claims.

An apparatus embodying my said invention is illustrated in the accompanying drawings, wherein, Figure 1 is a top plan view of the apparatus complete, Figure 2 a detail perspective view of the device for separating the sawed boards from the logs, Figure 3 a detail view showing the horizontal band saw as arranged for the re-sawing work, Figure 4 a side elevation, partly in section, of the board and log transferring mechanism, Figure 5 a detail view of one of the receiving tracks of the log and board separating device, Figure 6 a detail view of a section of the hog-back conveyer chain employed, Figure 7 a side elevation in detail of the log-part feed controlling mechanism, and Figure 8 a top or plan view of the same.

Referring to the construction in further detail, and with like reference characters indicating corresponding parts, the apparatus consists of suitable supports 1 from which the logs L are delivered to the carriage C that reciprocates on the tracks 2 to present the logs successively to the band saw 3 mounted on the pulley 4. The log is adapted to be secured on the carriage and manipulated by the usual dogs and "set-works", such as commonly employed for this purpose, and through the reciprocation of the carriage and manipulation of the log, it is "slabbed" or divided as may be desired for delivery to the re-saw.

The parts of logs leaving the main saw are then transferred, flat face down, onto the series of rollers 5 that are suitably journaled in the frame 6 and connected to be continuously driven from a source of power by the driving shaft 7 having miter gear connections 8 with each roller. The log is moved laterally or in its lengthwise direction, and with flat face down, onto the conveyer chains 9 that ride on the pulleys 10 mounted on the shafts 11 and 12, and the shaft 12 is adapted to be driven from the sprocket 13, or in any other approved manner. Bars 60 are pivoted at their rear ends on a shaft 61 and are positioned alongside each chain 9. Their forward ends are supported by toggle-links 62 on a shaft 63 to which each lower toggle member is rigidly secured. A lever 64 is also rigidly secured to said shaft 63 for operating the same and, through it, the toggles 62 and bars 60. A foot lever or pedal 65 is preferably hinged at 66 on a block or support 67 and extends across lever 64 (see Figures 7 and 8). The shaft 63 is mounted in appropriate bearings in supports 68 and the shaft 61 in bearings in supports 69.

The inner ends of the conveyer chains 9 project slightly over a frame 15 in which conveyer rollers 14 are journaled. Said rollers 14 are connected to be driven from the shaft 16 by miter gears 17. Said shaft 16 is geared to the power in any appropriate manner. The log-parts coming from the rollers 5 onto said conveyer chains 9, are carried along to the outer ends of said conveyer chains and delivered to the conveyer rollers 14, which operate to carry the log-part forward onto the support 18, where the horizontal re-saw 19 cuts a board of the required thickness from the underside of said log-part. In actual practice, an operator stands upon the foot pedal 65 which extends across the outer end of the frame 15, whereby he is enabled to watch the log-parts as they are fed from the carriers 9 to the rollers 14, and adjust them so that they will be presented to the horizontal re-saw in proper position, and also regulate their feed from said chains 9 to said rollers 14. This is done by elevating the front ends of the bars 60 through the medium of the lever 64 and toggle connection 62. The weight of the operator is sufficient to normally hold the front ends of said bars above the level of the chains 9 and thus retard any log-parts thereon. When it is desired to deposit a log-part, the operator steps one foot off onto the frame 15, or the floor, or any other stationary part, and thus relieves the lever 64 and permits bars 60 to fall and the chains 9 to carry the log-parts forward onto the rollers 14. In this way the operator is enabled to drop the log-parts onto said rollers 14, spaced apart exactly as desired, in order to keep the re-saw constantly at work. Should the number of log-parts accumulating on the chains 9 exceed the number required, the vertical saw can be employed for one or two extra cuts in certain logs, and thus the accurate and perfect co-operation of the two saws can be regulated so that each is always cutting to its full capacity. The band re-saw 19 is mounted on a pair of pulleys 20, driven from the shaft 21, and operates after the manner shown in Figure 3. The log and the board sawed therefrom remain together and are delivered to the conveying chains 22 constituting a receiver, and said chains are mounted on the shafts 23 and 24, driven by the chain and sprocket gearing 25 mounted on the said shaft 23. The several chains 22 are of the "hog-back" type, as shown in Figure 6, to the end that no obstruction will be offered for the easy placement of the logs thereon, as would be the case if the open link type of chain were employed.

The conveyer chains 22 operate to carry the log with the sawed board thereunder in a transverse direction and deliver the same to the series of upwardly inclined chains 26 riding on sprockets 27 and 28 that are secured to the shafts 24 and 29, respectively (see Figure 4). The supporting structure for the conveyer chains 22 and 26 consists of a platform 30 in which are journaled the bearings for the shafts 23, 24, and 29, and said platform is inclined upwardly towards the discharge end of said chains 26.

The logs, together with the respective boards sawed therefrom, are carried by the chains 26 to the upper end of the platform 30, and thence discharged onto the several inclined ways 31 (see Figure 2), when said logs and boards slide down said ways after the manner shown in Figures 2 and 4. The several ways 31 are provided with stops 32 of a height slightly less than the thickness of the boards, that engage with the forward edge of the board, arrest its motion, and allow the remaining log portion to pass on, being separated from the board by gravity, and taken up by the rollers 33 of the next conveyer.

The board is removed by hand from its supports on the ways 31 and placed on a separate conveyer for further treatment to be referred to later. The rollers 33 are suitably journaled on the frame 34 and uniformly driven from the shaft 35 by the miter gears 36; and said rollers convey the log portion, with flat face down, in a lateral direction for substantially the distance of its length, when it is transferred onto the conveyer chains 37, riding on pulleys secured to the shafts 38 and 39. Said chains 37 are driven by the sprocket 40 mounted on the shaft 38. The chains 37 are of the "hog-back" type for the purpose hereinbefore stated, and in operation carry the logs face down and transversely to the initial forwarding rollers 14 of the under cutting band saw 19, when the stages of operation just described are again gone through. The log is therefore moved continuously in a rectangular path with the boards being sawed off on the initial longitudinal movement, removed on the following transverse movement, and the remaining log portion returned to initial position by the following longitudinal and transverse movements, and these operations are repeated for the number of cycles required to cut the log into boards.

The "edger," which is auxiliary to the apparatus thus far described, comprises a conveyer consisting of two series of rollers 41 and 42, suitably journaled in the frame 43; and said rollers 42 are uniformly driven from the shaft 44 through the miter gears 45. The boards are placed on the rollers 43 by hand and are then delivered to the corrugated feeding rollers 46 and 47 for trimming by the edger saws 48, after the well known or any approved manner. I employ and prefer the edger construction as shown in my co-pending application, as further contributing to the saving of lumber and economy of operation.

It will be seen that the means herein shown and described, or some other suitable means, for removing the board from beneath the log-part after each operation of the re-saw, constitutes an important feature of the invention, inasmuch, as without some such means, the use of the re-saw for anything more than merely dividing a double thickness board would be impracticable and the resulting advantages could not be obtained. To accomplish such work manually is impossible for the reason that sufficient men to efficiently handle the logs cannot work in the positions allowed for workmen around the apparatus.

The advantages gained are many, including a large increase of production from a given number of logs, a large increase in output for the apparatus and crew during a given period of time, and a saving of labor in the turning of the logs as required by previous methods and in many other ways. These advantages are of great importance, not only in the amount of lumber saved, but also in increasing the capacity of the mill by keeping both saws cutting at their full capacity continuously.

It is obvious that those skilled in the art may devise other specific means for removing the board from under the log-part after each operation of the re-saw, and otherwise vary the details of construction and arrangement of parts of the apparatus without departing from the spirit of my invention, and therefore I do not wish to be limited to such features except as may be required by the claims.

Having thus fully described my said in- vention, what I claim as new and desire to secure by Letters Patent, is:

1. In an apparatus for sawing logs the combination of a supporting structure, a conveyer for moving the log longitudinally, a saw for cutting a board from the underside of the log during said movement, horizontally movable carriers adapted to receive the log and board and move the same transversely, inclined conveyers adapted to receive the log and board from said carriers, inclined ways adapted to receive the log and board from said inclined carriers, and stops mounted on said inclined ways adapted to engage and withhold the board and allow the log portion to separate therefrom by gravity, substantially as set forth.

2. In an apparatus for sawing logs the combination of a supporting structure, a carrier for moving the log longitudinally, a saw for cutting a board from the underside of the log during said movement, a horizontally movable carrier adapted to receive said log and board and move the same transversely, an inclined conveyer adapted to receive the log and board from said carrier, means for receiving the log and board from said conveyer and separate the log from the sawed board, a carrier for receiving the log portion and moving the same longitudinally, and a carrier for receiving the log from said last named carrier and transferring same to the first named carrier, substantially as set forth.

3. In an apparatus for sawing logs the combination of supporting rollers adapted to move the log longitudinally, a saw adapted to cut a board from the underside of the log during said movement, horizontally movable chain conveyers adapted to receive and transfer the log and sawed board transversely, upwardly inclined chain conveyers adapted to receive the log and board from said horizontal chains, a plurality of downwardly inclined ways adapted to receive the log and board discharged from said upwardly inclined chains, stops mounted on said ways adapted to engage with and withhold the board from the log portion and allow said log portion to separate by gravity, and conveying mechanism for receiving the log from said ways and returning it to the saw, substantially as set forth.

In witness whereof, I have hereunto set my hand and seal at Elizabeth City, North Carolina, this 9th day of May, A. D. nineteen hundred and sixteen.

LEMUEL ROSCOE FOREMAN. [L. S.]

Witnesses:
E. W. BRADFORD,
E. G. CLEMENTS.